United States Patent [19]

Meisel, Jr.

[11] 4,359,914
[45] Nov. 23, 1982

[54] ARRANGEMENT FOR A PLANETARY DRIVE ASSEMBLY

[75] Inventor: Thomas C. Meisel, Jr., Peoria, Ill.

[73] Assignee: Caterpillar Tractor Co., Peoria, Ill.

[21] Appl. No.: 937,004

[22] Filed: Aug. 25, 1978

[51] Int. Cl.³ .......................... F16H 3/44; F16H 57/10
[52] U.S. Cl. ........................................ 74/788; 74/785; 74/801
[58] Field of Search ................. 74/801, 785, 788, 797, 74/802

[56] References Cited

U.S. PATENT DOCUMENTS

| | | | |
|---|---|---|---|
| 2,402,756 | 6/1946 | Lawler | 74/801 X |
| 2,554,785 | 5/1951 | Leliter | 180/22 |
| 2,591,734 | 4/1952 | Smith et al. | 74/801 |
| 2,939,346 | 6/1960 | McCarthy et al. | 74/785 X |
| 3,055,448 | 9/1962 | Fagel | 74/785 X |
| 3,106,997 | 10/1963 | White | 74/785 X |
| 3,452,612 | 7/1969 | Casey | 74/391 |
| 3,454,109 | 7/1969 | Roberts | 172/781 |
| 3,518,897 | 7/1970 | Bixby | 74/801 X |
| 3,943,780 | 3/1976 | Klaue | 74/801 X |
| 3,990,528 | 11/1976 | Haak et al. | 74/801 X |
| 4,132,134 | 1/1979 | Avery et al. | 74/801 |

FOREIGN PATENT DOCUMENTS

| | | | |
|---|---|---|---|
| 1066406 | 6/1954 | France | 74/785 |
| 1249299 | 11/1960 | France | 74/801 |
| 405548 | 8/1943 | Italy | 74/801 |
| 27734 | of 1903 | United Kingdom | 74/785 |
| 901960 | 7/1962 | United Kingdom | 74/785 |

OTHER PUBLICATIONS

Parts Book of Caterpillar Tractor Co., 16G Motor Grader, p. 144, Nov. 1977.

*Primary Examiner*—Leslie A. Braun
*Attorney, Agent, or Firm*—William B. Heming

[57] ABSTRACT

A drive assembly (20) has a planetary gear assembly (27), driven member (22), and first housing element (28). The assembly (20) is, for example, part of a final drive (12) of a work vehicle (10) or pulley drive for a material handling system. A first bearing element (30) supports the driven member (22) in rotatable relationship relative to the housing element (28). A second bearing element (32) supports the housing element (28) in rotatable relationship relative to the gear assembly (27). On the vehicle (10), gear reduction taken inside of a tandem housing (14) has heretofore resulted in an overturning reaction force on the housing (14) which creates unequal wheel loads. In the drive assembly (20), the first and second bearing elements (30,32) are positioned between the driven member (22) and housing element (28) and a ring gear element (40) of the gear assembly (27) and the housing element (28), respectively, to provide gear reduction substantially within and to substantially prevent the reaction force on the tandem housing (14).

13 Claims, 3 Drawing Figures

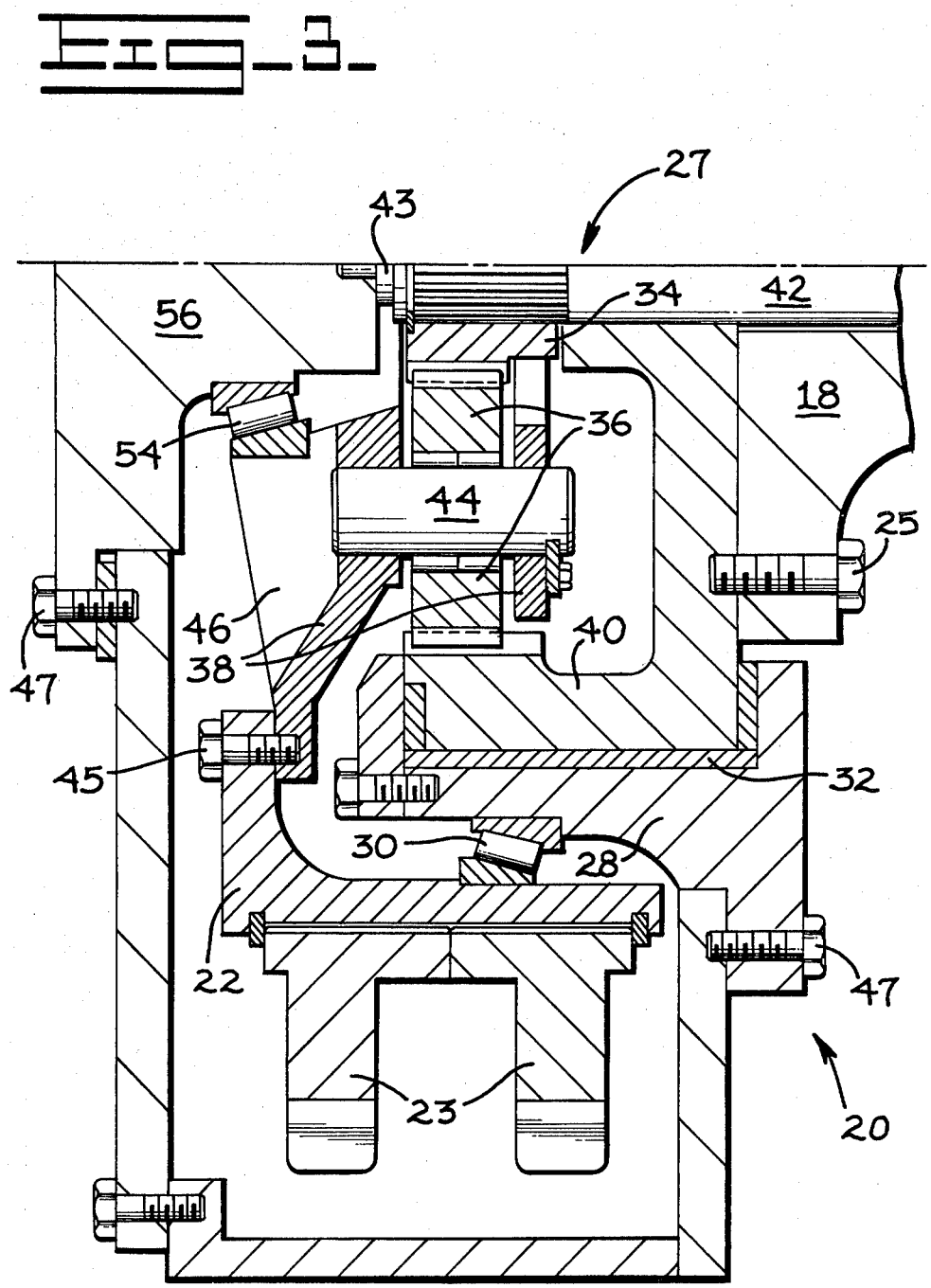
Fig_3_

ARRANGEMENT FOR A PLANETARY DRIVE ASSEMBLY

TECHNICAL FIELD

The invention relates to a drive assembly having a planetary gear assembly, a driven member, and a housing element, such as is used for the final drive of a work vehicle. More particularly, the invention relates to a first bearing element positioned between and in contact with the driven member and housing element and a second bearing element positioned between the housing element and a ring gear element of the gear assembly and in contact with the housing element.

BACKGROUND ART

In the use of a drive assembly, it is desirable to take planetary gear reduction substantially within a tandem housing connected to said drive assembly. The invention relates to a first bearing element positioned between and in contact with a driven member or sprocket and a first housing element of the drive assembly to support the driven member in rotatable relationship relative to the first housing element. A second bearing element is positioned between a ring gear element of a planetary gear assembly and the first housing element and in contact with said first housing element. Said second bearing element supports the first housing element in rotatable relationship relative to the gear assembly.

U.S. Pat. No. 3,452,612 which issued on July 1, 1969, to Casey, discloses a drive assembly having a planetary gear assembly for gear reduction in the driving of a wheel assembly. A first bearing element is positioned between the driven member or wheel assembly and the axle housing.

U.S. Pat. No. 3,454,109 which issued on July 8, 1969, to Roberts, discloses a pivotal tandem housing of a motor grader. Gear reduction is taken by chain driven sprockets mounted inside the tandem housing.

A work vehicle, for example, commonly has a planetary final drive connected to the ends of each axle housing. Gear reduction is taken by a planetary gear assembly in the final drive. The axle shaft provides input through rotation of a sun gear. The resultant action of the planet gears relative to the ring gear provides an output through the planet carrier. The carrier typically drives a wheel assembly.

It is desirable to pivotally connect a tandem housing to the work vehicle in order to mount tandem wheels to the final drive of the vehicle. This provides low ground pressure, increased tractive effort and better response to changing terrain on such vehicles as motor graders and log skidders. A sprocket, positioned in the tandem housing, is driven by the planet carrier. A chain engaging the sprocket drives the wheels.

However, connecting the tandem housing to the ring gear in order to position the planetary gear assembly inside the tandem housing tends to cause an overturning reaction force in the housing. The result is uneven wheel loading and possible rotation of the tandem housing during vehicle operation.

Therefore, in the drive assembly, it is desirable to position a first bearing element between and in contact with the driven member or sprocket and a housing element and a second bearing element between the ring gear and housing elements and in contact with the housing element. The tandem housing is therefore connectable to the housing element in a manner substantially enclosing the drive assembly for gear reduction inside said housing.

DISCLOSURE OF INVENTION

In one aspect of the invention, a drive assembly has a planetary gear assembly, a driven member, a first housing element, and first and second bearing elements. Said gear assembly has sun gear, planet gear, carrier and ring gear elements. The carrier element is connected to the driven member in a manner sufficient for rotating the driven member. The first bearing element is positioned between and in contact with the driven member and the first housing element. Said first bearing element supports the driven member in rotatable relationship relative to the first housing element. The second bearing element is positioned between the ring gear element and the first housing element and in contact with the first housing element. Said second bearing element supports the first housing element in rotatable relationship relative to the gear assembly.

A tandem housing is pivotally connected to a work vehicle to mount tandem wheels to the vehicle. Gear reduction taken inside of the tandem housing by the planetary gear assembly has heretofore resulted in an overturning reaction force on the tandem housing which creates unequal wheel loads. In the drive assembly, the first and second bearing elements are positioned between the driven member and first housing element and the first housing element and ring gear element, respectively. The tandem housing, being connectable to the first housing element to substantially enclose the gear assembly, is substantially free from the overturning reaction force.

BRIEF DESCRIPTION OF DRAWINGS

FIG. 3 is a diagrammatic cross-sectional view of another embodiment of the invention.

BEST MODE FOR CARRYING OUT THE INVENTION

Figure 1:
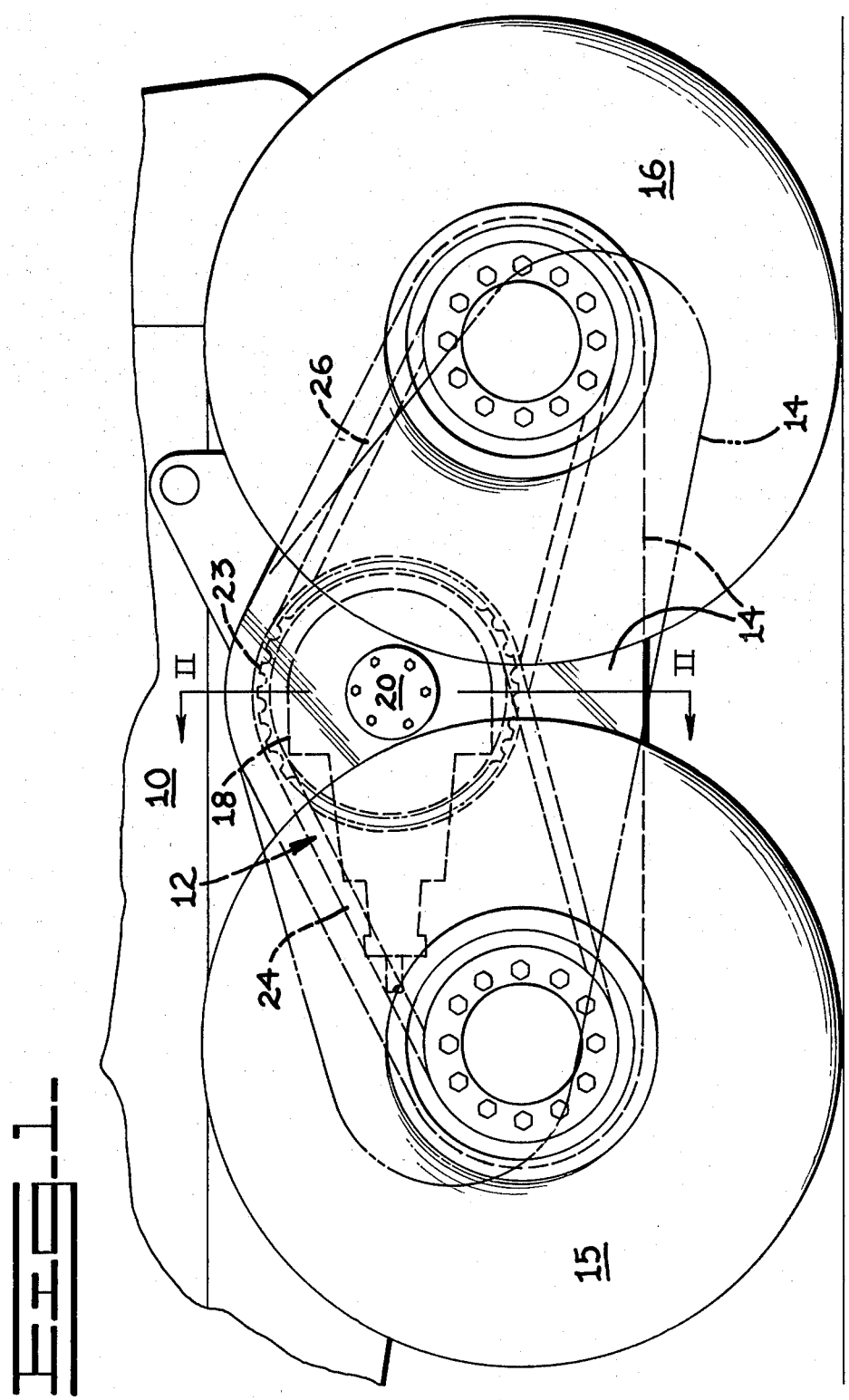
FIG. 1 is a diagrammatic view showing an embodiment of the invention on a work vehicle.

Referring to the drawings, a work vehicle 10 has a final drive 12, a tandem housing 14, and first and second wheels 15,16 connected to the tandem housing 14. The final drive 12 has an axle housing 18 and a drive assembly 20. The drive assembly 20 has a driven member 22, shown as a double sprocket 22 having removably connected teeth 23, engaging first and second chains 24,26 to drive the wheels 15,16.

Figure 2:
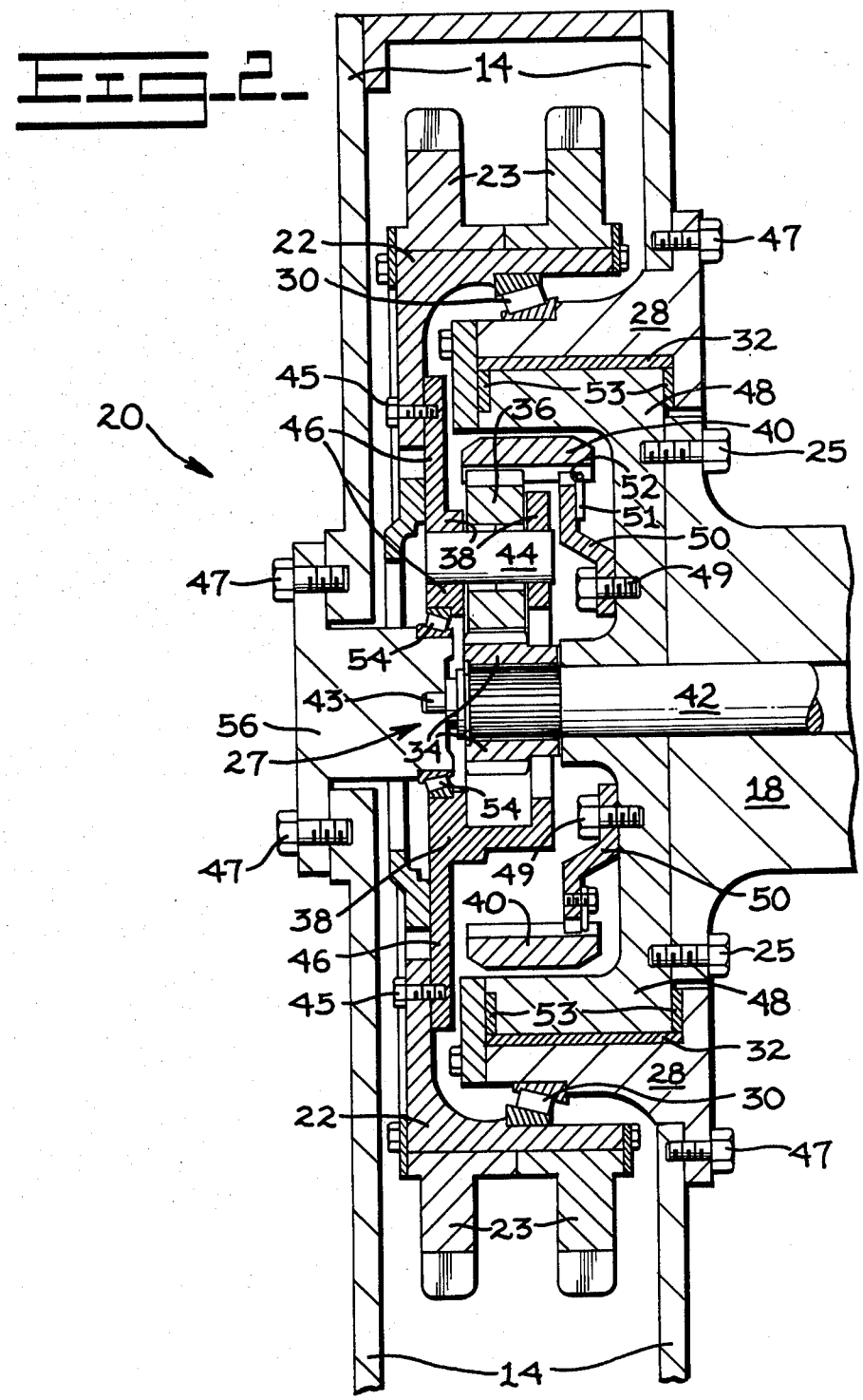
FIG. 2 is a diagrammatic cross-sectional view, taken along line II—II of FIG. 1, showing the invention in greater detail.

Referring to FIGS. 2 and 3, the drive assembly 20 is connected to the axle housing 18 by bolts 25 or the like. The drive assembly 20 has a planetary gear assembly 27, a first housing element 28, first and second bearing elements 30,32, and the driven member 22. Said planetary gear assembly 27 includes sun gear 34, planetary gear 36, carrier 38, and ring gear 40 elements. An axle shaft 42 passes through the axle housing 18 and is splinably connected to the sun gear element 24. A button 43 acts as a thrust washer to maintain position of the shaft 42 relative to the drive assembly 20. The planetary gear elements 36, one of which is shown in the cross-sectional views of FIGS. 2 and 3, rotate about respective pins 44 in relationship with the sun and ring gear elements 34,40. Rotation of the planet gear elements 36 results in rotation of the carrier element 38. Such planetary gear assemblies are well known in the art and are commonly used to provide gear reduction in final drive assemblies of work vehicles.

The carrier element 38 is connected to the driven member 22 in a manner sufficient for rotating the driven member 22. As is shown, the carrier element 38 has a flange 46 connected to the driven member 22 by bolts 45 or the like.

The first bearing element 30 is positioned between and in contact with the driven member 22 and the first housing element 28. Preferably, said first bearing element 30 is radially positioned between the drive member 22 and the first housing element 28. The first bearing element 30 supports the driven member 22 in rotatable relationship relative to the first housing element 28.

The second bearing element 32 is positioned between the ring gear element 40 and the first housing element 28 and in contact with the first housing element 28. Said second bearing element 32 is preferably radially positioned between the ring gear element 40 and the first housing element 28. The second bearing element 32 supports the first housing element 28 in rotatable relationship relative to the gear assembly 27. The tandem housing 14 is connected to said first housing element 28 by bolts 47 or the like.

In the embodiment of FIG. 2, the drive assembly 20 has a support member 48 connecting said drive assembly 20 to the axle housing 18 by the bolts 25. The second bearing element 32 is in contact with said support member 48. A retainer 50 preferably connects the ring gear element 40 to the support member 48. Said retainer 50 is connected by bolts 49 to the support member 48. Said retainer 50 has teeth engaging the teeth of the ring gear element 40 about the entire circumference for maintaining said element 40 against rotation. A locking portion 51 of the retainer 50 engages a circumferential groove 52 in the ring gear element 40 to maintain said element 40 against axial movement. The retainer 50 thus accommodates dimensional changes of the ring gear element 40 caused by operating demands on the planetary gear assembly 27.

In the embodiment of FIG. 3, the second bearing element 32 is in contact with the ring gear element 40. Said ring gear element 40 is connected directly to the axle housing 18 by the bolts 25.

The first bearing element 30 is shown as a roller bearing assembly. The second bearing element 32, shown as fabric bearings preferably of a phenolic material, also has thrust bearing portions 53 to maintain alignment of the first housing element 28 in rotation. It should be understood that said bearing elements 30,32 can be of other configurations, as is known in the art, without departing from the invention.

It is desirable that the drive assembly 20 include a third bearing element 54 and a second housing element 56. The third bearing element 54 is positioned between and in contact with the flange 46 and the second housing element 56. Preferably, the third bearing element 54 is radially positioned between said flange 46 and the second housing element 56. Said bearing element 54 supports the second housing element 56 in rotatable relationship relative to the planetary gear assembly 27. The tandem housing 14 is also connected to the second housing element 56 by bolts 47 or the like. The third bearing element 54 is shown as a roller bearing assembly. It should be understood that the third bearing element 54 can be of other configurations without departing from the invention.

INDUSTRIAL APPLICABILITY

In the use of the drive assembly 20, the tandem housing 14 pivots relative to the vehicle 10 in response to elevational differences in the terrain and substantially encloses the drive assembly 20 for protective and easily accessible positioning of the reduction gear assembly 27 and the driven member 22.

For example, as is used on the work vehicle 10, the axle shaft 42 is rotated by a power source (not shown) of the vehicle 10 for driving the wheels 15,16. The planetary gear assembly 27 provides gear reduction between said shaft 42 and the driven member or sprocket 22. Rotation of the carrier element 38 results in rotation of the sprocket 22. Said sprocket 22 rotates relative to the first and second housing elements 28,56 owing to the positions of the first and third elements 30,54. The sprocket 22 engages and drives the chains 24,26 for rotating respective wheels 15,16.

The tandem housing 14 pivotally moves in response to elevational differences of the terrain (FIG. 1). Said housing 14 pivotally moves relative to the sprocket 22 and gear assembly 27 owing to the positions of the bearing elements 30,32,54 relative to the housing elements 28,56. Therefore, the tandem housing 14 freely pivots only in response to conditions external to the final drive 12. The reaction member or ring gear element 40 is connected to the axle housing 18 to isolate from the tandem housing 14 overturning reaction forces caused by the gear assembly 27 during operation of the vehicle 10. The tandem housing 14 also substantially encloses the drive assembly 20 owing to the substantially concentric orientation of the respective components. The result is serviceability of the assembly 20 as a unit and a more adaptable final drive unit for vehicles currently using planetary final drives similarly mounted to the ends of axle housings.

Other aspects, objects, and advantages of this invention can be obtained from a study of the drawings, the disclosure, and the appended claims.

What is claimed is:

1. A drive assembly (20), comprising:
   a driven member (22);
   a planetary gear assembly (27) having sun gear (34), planet gear (36), carrier (38), and ring gear (40) elements, said carrier element (38) being connected to the driven member (22) for rotating said driven member (22);
   a first housing element (28) rotatable relative to said ring gear element (40);
   a first bearing element (30) supporting the driven member (22) in rotatable relationship relative to the first housing element (28) and being positioned between and in contact with the driven member (22) and the first housing element (28); and
   a second bearing element (32) supporting the first housing element (28) in rotatable relationship relative to the ring gear element and being positioned between the ring gear element (40) and the first housing element (28) and in contact with said first housing element (28).

2. The drive assembly, as set forth in claim 1, wherein the first bearing element (30) is radially positioned between the driven member (22) and the first housing element (28).

3. The drive assembly, as set forth in claim 1, wherein the second bearing element (32) is radially positioned between the ring gear element (40) and the first housing element (28).

4. The drive assembly, as set forth in claim 1, wherein the driven element (22) is a sprocket (22) and the first housing element (28) is connected to a tandem housing (14).

5. The drive assembly, as set forth in claim 1, wherein said second bearing element (32) is in contact with the ring gear element (40).

6. The drive assembly, as set forth in claim 1, including a support member (48) and wherein the ring gear element (40) is connected to said support member (48) and the second bearing element (32) is in contact with said support member (48).

7. The drive assembly, as set forth in claim 1, wherein the carrier element (38) has a flange (46) connected to the driven member (22) and including a third bearing element (54) and a second housing element (56), said third bearing element (54) being positioned between and in contact with said flange (46) and the second housing element (56) and supporting said second housing element (56) in rotatable relationship relative to the gear assembly (27).

8. The drive assembly, as set forth in claim 7, wherein the third bearing element (54) is radially positioned between the flange (46) and the second housing element (56).

9. An apparatus, comprising:
an axle housing (18);
a driven member (22) rotatable relative to said axle housing (18);
a planetary gear assembly (27) having sun gear, planet gear, carrier and ring gear elements (34,36,38,40), said carrier element (38) being connected to the driven member (22) for rotating the driven member (22), said ring gear element (40) being fixed relative to said axle housing (18);
an axle shaft (42) connected to the sun gear element (34) and passing through and being rotatable relative to said axle housing (18);
a first housing element (28) rotatable relative to said axle housing (18);
a first bearing element (30) positioned between and in contact with the driven member (22) and the first housing element (28), said first bearing element (30) supporting the driven member (22) in rotatable relationship relative to the first housing element (28); and
a second bearing element (32) positioned between the ring gear element (40) and the first housing element (28) and in contact with the first housing element (28), said second bearing element (30) supporting the first housing element (28) in pivotal relationship relative to the axle housing (18); and a housing (14) connected to said first housing element (28) and substantially enclosing the driven member (22) and gear assembly (27).

10. A drive assembly (20), comprising:
an axle housing (18);
a driven member (22);
a first housing element (28);
a planetary gear assembly (27) having sun gear (34), planet gear (36), carrier (38) and ring gear (40) elements, said carrier element (38) being connected to the driven member (22) for rotating said driven member (22) in response to a rotational input on said carrier element (38), said ring gear element (40) being fixed relative to said axle housing (18);
a first bearing element (30) positioned between and in contact with the driven member (22) and the first housing element (28) and supporting the driven member (22) in pivotal relationship relative to the first housing element (28); and
a second bearing element (32) positioned between the ring gear element (40) and the first housing element (28) and in contact with said first housing element (28) and supporting the first housing element (28) in pivotal relationship relative to the axle housing (18).

11. A drive assembly, comprising:
an axle housing (18);
a planetary gear assembly (27) having sun gear (34), planet gear (36), carrier (38) and ring gear (40) elements and being supported by said housing (18), said ring gear element (40) being fixed relative to said housing (18);
a first housing element (28) positioned about and in pivotal relationship relative to said ring gear element (40); and
a driven member (22) positioned about and in rotatable relationship relative to said first housing element (28) and being rotatable relative to said housing (18) in response to a rotational input on said carrier element (38).

12. The drive assembly (20), as set forth in claim 11, wherein said first housing element (28) is positioned radially between said ring gear element (40) and said driven member (22) relative to the axis of pivotal movement of said first housing element (28) and extends between said ring gear element (40) and said driven member (22) along said axis of pivotal movement.

13. The drive assembly (20), as set forth in claim 11, wherein said driven member (22) is connected to said carrier element (38) adjacent one end of said first housing element (28) and including a housing (14) connected to said first housing element (28) at the other end of said first housing element (28) opposite said connection of said driven member (22) and said carrier element (30) and positioned about said driven member (22) and said planetary gear assembly (27).

* * * * *